(12) United States Patent
Smith

(10) Patent No.: US 6,997,268 B2
(45) Date of Patent: Feb. 14, 2006

(54) TRIMMER

(75) Inventor: Ian Zetterstrom Smith, Yorkshire (GB)

(73) Assignee: Electrolux Outdoor Products Limited, Country Durham (GB)

( * ) Notice: Subject to any disclaimer, the term of this patent is extended or adjusted under 35 U.S.C. 154(b) by 35 days.

(21) Appl. No.: 10/699,905

(22) Filed: Nov. 3, 2003

(65) Prior Publication Data

US 2004/0088867 A1 May 13, 2004

(30) Foreign Application Priority Data

Nov. 4, 2002 (GB) .................................... 0225686

(51) Int. Cl.
*A01D 15/00* (2006.01)
*A01D 21/00* (2006.01)
*A01D 23/00* (2006.01)
*A01D 27/00* (2006.01)
*A01D 34/00* (2006.01)

(52) U.S. Cl. ............................ 172/14; 172/17; 172/41; 172/42; 172/123; 172/247; 172/254; 172/345; 172/351; 56/249; 56/294

(58) Field of Classification Search ............ 172/13–17, 172/41, 42, 43, 118, 122, 123, 245, 247, 250, 172/254, 329, 332, 345, 351, 371–373; 56/233, 56/239, 249–256, 294, 295
See application file for complete search history.

(56) References Cited

U.S. PATENT DOCUMENTS

| 3,086,596 | A | 4/1963 | Allegretti et al. ............. 172/15 |
| 4,360,971 | A | 11/1982 | Fellmann .................. 56/256 X |
| 4,364,435 | A | 12/1982 | Tuggle et al. ................. 172/15 |
| 4,914,899 | A | 4/1990 | Carmine .................... 172/17 X |
| 4,981,012 | A | 1/1991 | Claborn ........................ 56/16.9 |
| 6,092,608 | A | 7/2000 | Leger ......................... 172/15 |
| 2001/0034940 | A1 | 11/2001 | Marshall et al. .............. 30/276 |

FOREIGN PATENT DOCUMENTS

| GB | 1006000 | 9/1965 |
| GB | 1006535 | 10/1965 |

*Primary Examiner*—Christopher J. Novosad
(74) *Attorney, Agent, or Firm*—Pearne & Gordon LLP

(57) ABSTRACT

A trimmer comprises a cutting head (1) housing a cutter (5), and a shaft (2) for supporting the cutting head. A large diameter wheel (8) is rotatably mounted with respect to the cutting head (1), and a motor is provided for driving the cutter (5) via an output shaft (7). The cutting head (1) is connected to the shaft (2) by a joint (3) permitting the cutting head (1) to be positioned with its cutter (5) either substantially horizontal or substantially vertical. The wheel (8) is sized to contact the ground when the cutter (5) is substantially vertical and to circumscribed the axis of the output shaft (7). The arrangement is such that the cutter (5) extends beyond the circumference of the wheel (8).

19 Claims, 6 Drawing Sheets

TRIMMER

This invention relates to a grass trimming device which is capable of being switched between at least two alternative configurations which are suitable for grass trimming and edge trimming respectively.

A known grass trimming device (trimmer) comprises a cutting head mounted at one end of a shaft, an operator handle being positioned at the other end of the shaft. The cutting head includes a cutter constituted by a rotatable blade or a rotatable flexible cutting line. The cutting head can be moved relative to the shaft, to position the cutter generally horizontal for grass trimming and generally vertical for edge trimming. A small diameter wheel or roller, typically rotatably mounted in (or hanging from) the housing of the cutting head, may be provided for rolling the trimmer along a lawn edge when the trimmer is in the edging mode. Unfortunately, the wheels or rollers of known trimmers are so small that negotiation of uneven lawn surfaces or riding over obstacles such as twigs and stones is difficult, particularly if the user employs single-handed control of the trimmer. A trimmer of this type can be operated using two hands, though difficulties can still arise in negotiating uneven lawn surfaces. Thus, although two-handed operation of such a trimmer is easier than one-handed operation—partly because it is easier to push the trimmer using two hands, and partly because one hand can be used to lift the "front" of the trimmer whilst the other hand is used to push the trimmer—it is still difficult to control the movement of the trimmer sufficiently accurately to ensure a good edging performance.

Known trimmers are relatively easy to operate when in the trimming configuration. However, when in the edging configuration, the user must stand at right-angles to the edge of a lawn being trimmed, and move sideways along that edge as trimming progresses. This is disadvantageous, in that it is difficult to align the cutter accurately with the edge of the lawn (owing to the eye of the user not being in alignment with the lawn edge), and this can lead to a poor edging performance. This poor edging performance is exacerbated by difficulties caused by negotiation of uneven lawn surfaces or riding over obstacles.

The aim of the invention is to provide a trimmer having improved edging capabilities.

The present invention provides a trimmer comprising a cutting head having a guard housing a cutter means, a shaft for supporting the cutting head, roller means rotatably mounted with respect to the cutting head, and drive means for driving the cutter means, the roller means being located outside the guard on the drive means side thereof, the cutting head being connected to the shaft by connection means permitting the cutting head to be positioned with its cutter means either substantially horizontal or substantially vertical, the roller means being sized to contact the ground when the cutter means is substantially vertical and to circumscribe the axis of the drive means, the arrangement being such that the cutter means extends beyond the circumference of the roller means.

In a preferred embodiment, the connection means is constituted by a rotatable joint, and preferably the rotatable joint is constituted by a ball-and-socket joint. In this case, the ball may be fixed to the cutting head by a neck portion, and the socket may be defined by a generally spherical socket portion provided at one end of the shaft.

Advantageously, the roller means is a wheel.

In a preferred embodiment, the wheel is detachably mounted on the connection means. Advantageously, the wheel is detachably mounted on the neck portion.

Preferably, the wheel is formed with a break in its circumferential region, portions of said region adjacent to the break being formed with complementary, detachably-engagable connections. In this case, the wheel may be of two-part construction having first and second generally semi-circular wheel members, first ends of which are pivotally connected together, the second ends of the wheel members being formed with complementary, detachably-engagable connectors.

Preferably, the inner circumferential region of the wall and the neck portion are formed with complementary, interengagable location means. In this case, the wheel may be formed with an inwardly-projecting flange on its inner circumferential region, the flange being engagable within a complementary recess formed in the neck portion.

Advantageously, the drive means comprises a motor and a drive shaft, the drive shaft passing through the roller means.

Preferably, the cutter means is rotatable, and the drive engagement between the motor and the cutter means is a rotatable drive engagement. The motor may be an electric motor.

In a preferred embodiment, a rotatable cutter line constitutes the cutter means.

Advantageously, the axis of rotation of the roller means is substantially coincident with the axis of rotation of the cutter means. Advantageously, the radius of the roller means is of the order of, but slightly less than, the effective radius of the cutter means.

A trimmer constructed in accordance with the invention will now be described, by way of example, with reference to the drawings, in which.

Figure 1:
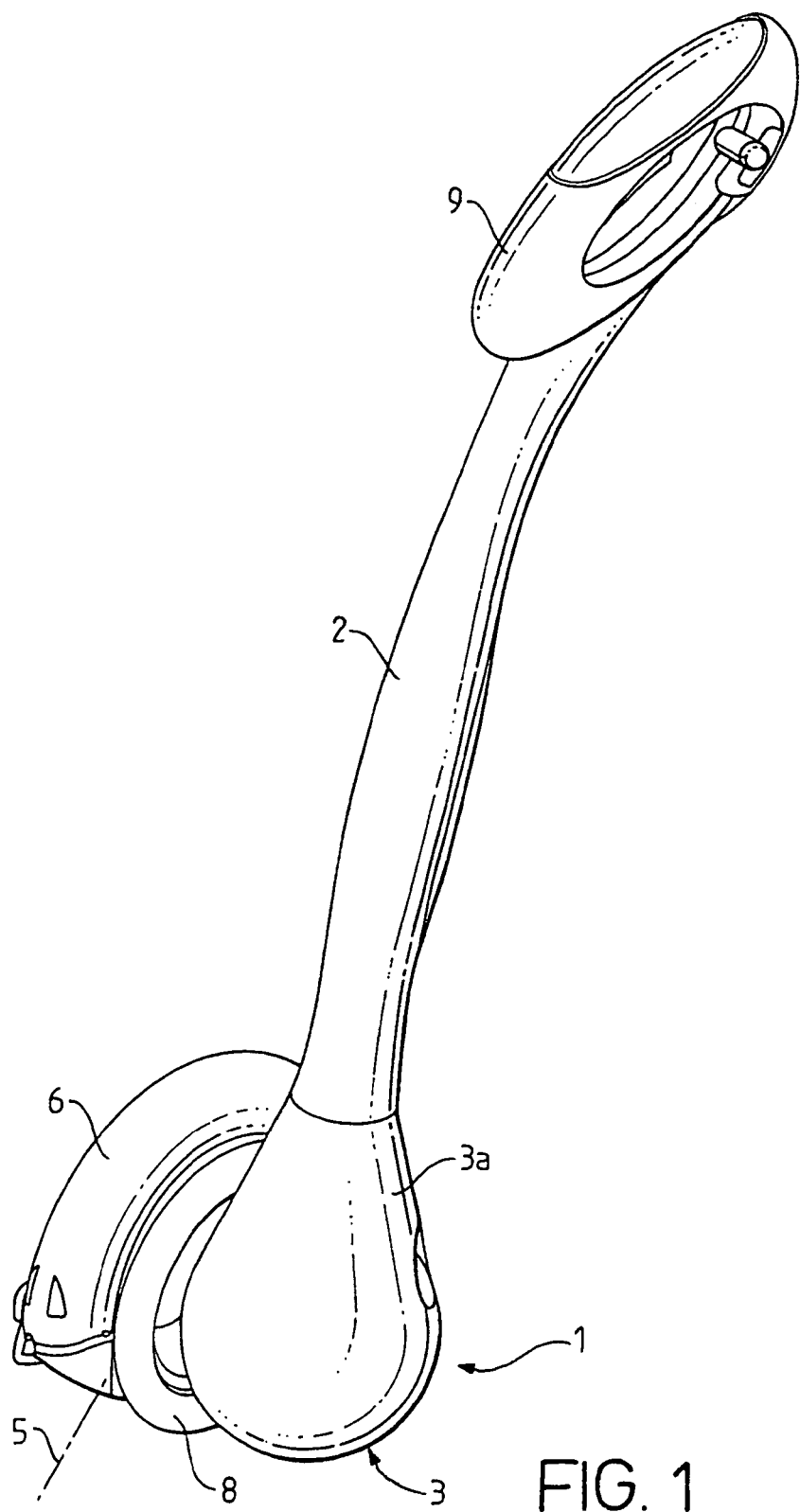
FIG. 1 is perspective view of the trimmer.

As shown in the drawings, the trimmer comprises a cutting head 1 which is connected to a shaft 2 by means of a ball-and-socket joint 3. The joint 3 is constituted by a housing 3a, which is integrally formed with the shaft 2, and a ball 3b which is fixed to the cutting head 1 by a neck portion 3c. The housing 3a defines a generally spherical socket which complements the shape of the ball 3b. The shaft 2 and the housing 3a are made of a plastics material such as ABS or polypropylene, and the ball 3b is made of a plastics material such as ABS or polypropylene. The cutting head 1 includes a rotatable hub 4 which houses a coiled up flexible cutter line (only the free end of portion 5 of which can be seen in the drawings). The cutter line 5 exits the hub 4 via an aperture 4a, and can be fed out (in known manner) as the cutter line wears. The axis A of rotation of the joint 3 (see FIG. 4) lies at an angle of substantially 35.5° to the plane of rotation of the cutter line 5.

The cutting head 1 is also provided with a guard 6 made of a plastics material such as ABS or polypropylene. The guard 6 partially surrounds the hub 4 and the cutter line 5 in such a manner that the cutter line has an effective cutting range which extends somewhat less than 180°. The hub 4 is rotatably driven by an electric motor (only the output shaft 7 of which can be seen), the motor being housed within the ball 3*b*. A wheel 8 made of a plastics material such as ABS or polypropylene is mounted between the guard 6 and the housing 3*a*, the wheel being rotatable relative to the guard about the axis of the motor shaft 7, and having a radius that is slightly less than the effective radius of the cutter line 5. A hand grip 9 is provided at the free (upper) end of the handle 2.

Figure 2:
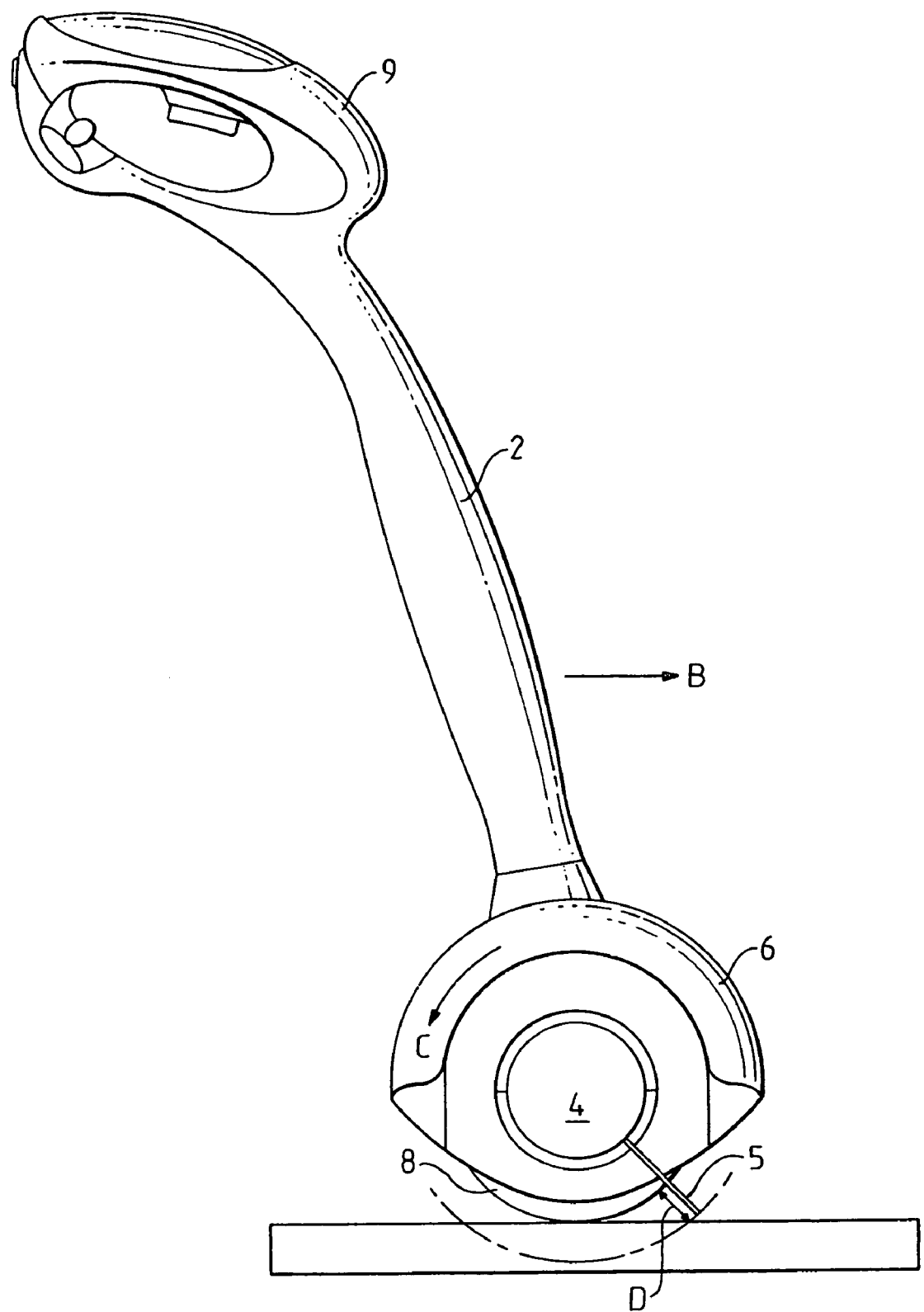
FIG. 2 is a side elevation of the trimmer in edging mode.
Figure 3:
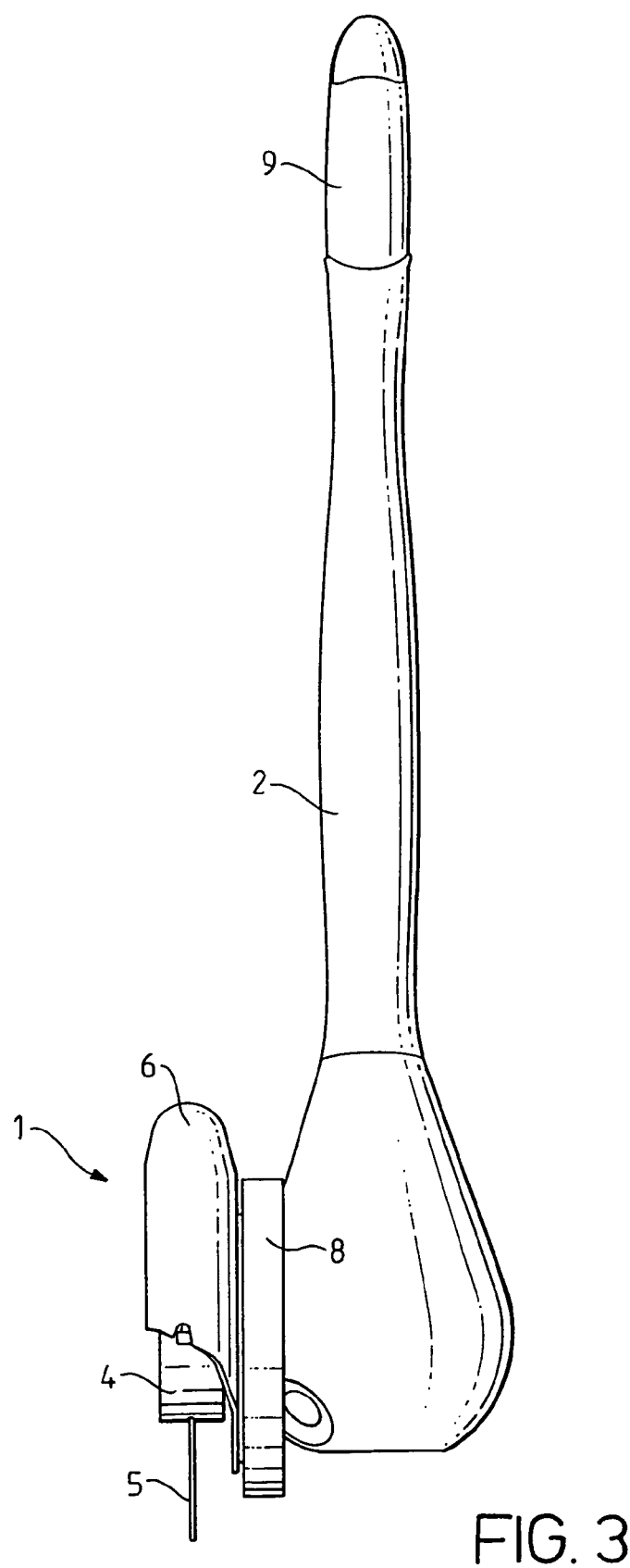
FIG. 3 is a front elevation of the trimmer in edging mode.

FIGS. 2 and 3 show the trimmer 1 in the edging position, that is to say with the cutting head 1 positioned so that the cutter line 5 is generally vertical. In this position, as shown in FIG. 2, the rim of the wheel 8 can be positioned on a lawn adjacent to the edge thereof, so that the cutter line 5 is positioned for an edging operation. The trimmer can then be advanced along the edge of the lawn to carry out the edging operation. As shown in FIG. 2, the distance between the effective radius of the cutter line 5 and the radius of the wheel 8 defines the depth of cut (cutting swathe) which can be effected with the trimmer in the edging position. In FIG. 2, arrow B indicates the edging direction (that is to say the direction in which the trimmer is moved during edging), arrow C indicates the cutting direction (that is to say the direction of rotation of the cutter line 5), and double-headed arrow D indicates the depth of cut (the cutting swathe) of the cutter line 5.

Figure 4:
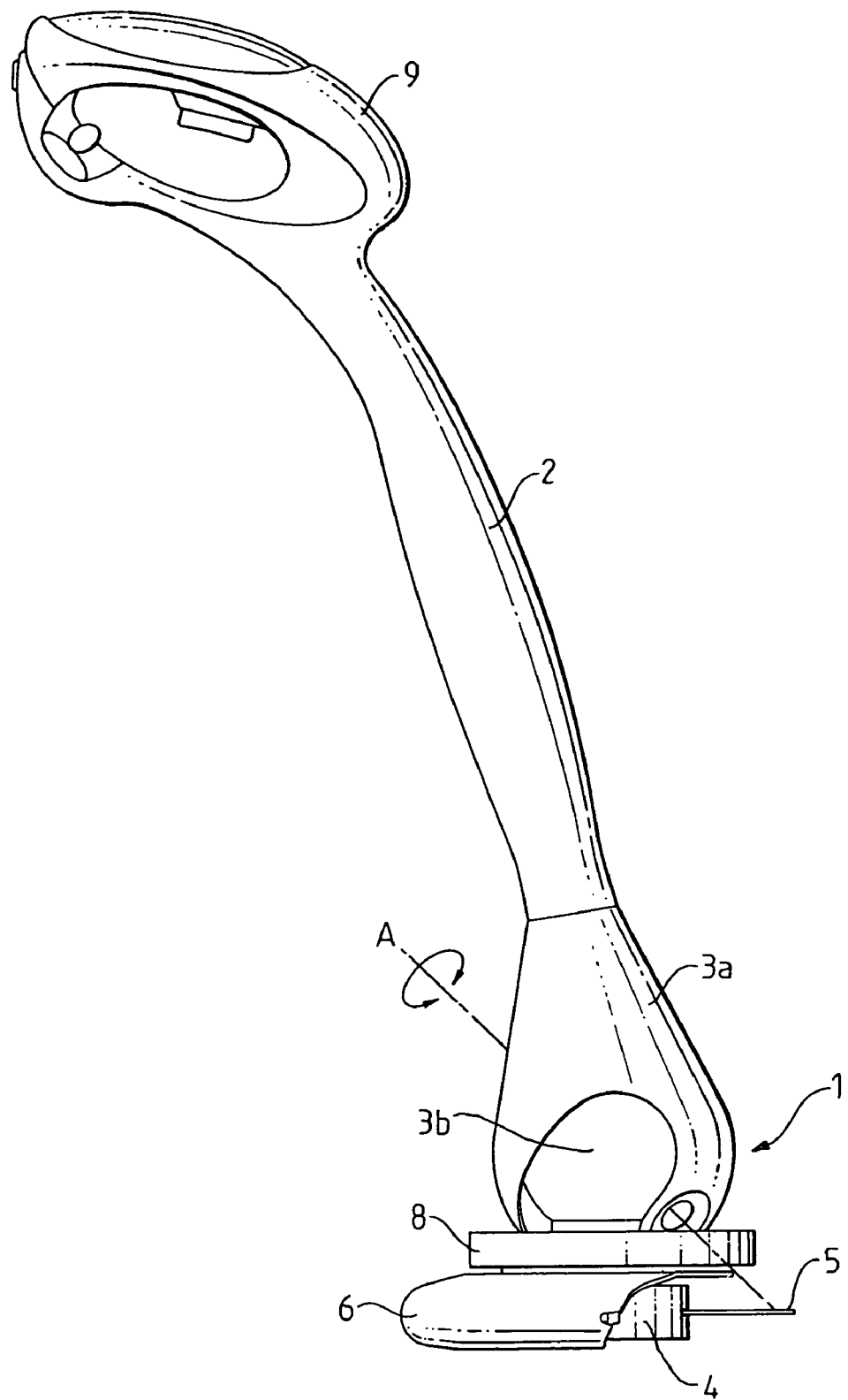
FIG. 4 is a side elevation of the trimmer in trimming mode.
Figure 5:
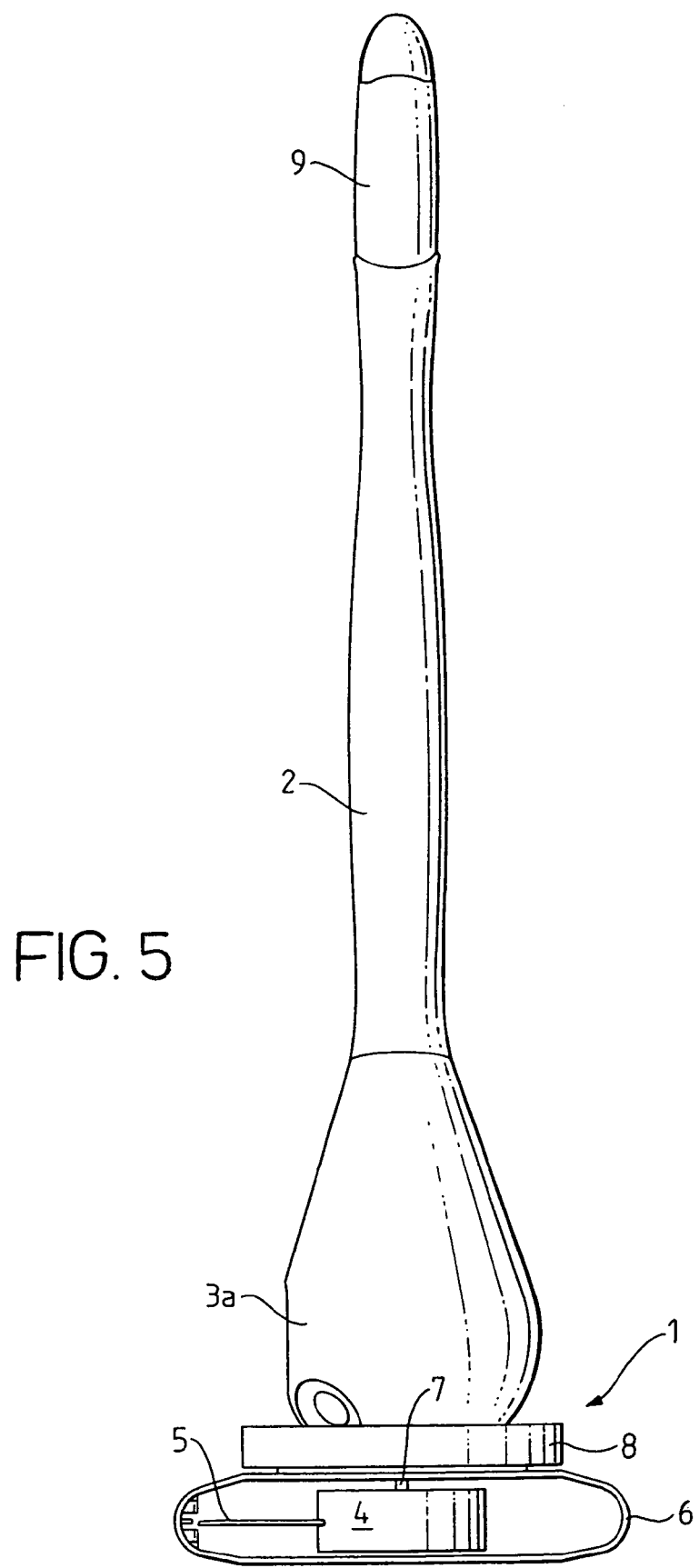
FIG. 5 is a front elevation of the trimmer in trimming mode.

In order to change the trimmer from its edging mode to its trimming mode, it is necessary only to rotate the cutting head 1 relative to the shaft 2, through either 120° in one direction, or 240° in the other direction. FIGS. 4 and 5 show the trimmer with the cutting head 1 in the trimming position, that is to say with the cutter line 5 generally horizontal.

Figure 6:
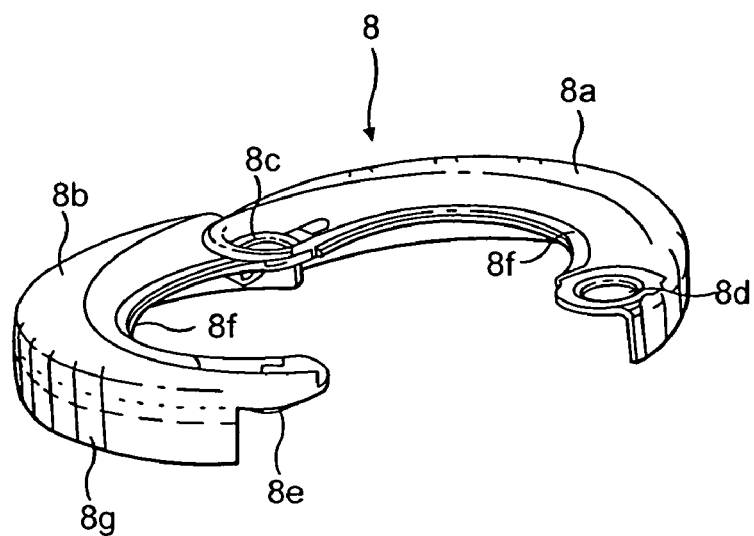
FIG. 6 is a perspective view of a wheel forming part of the trimmer, the wheel being shown separate from the trimmer.
Figure 7:
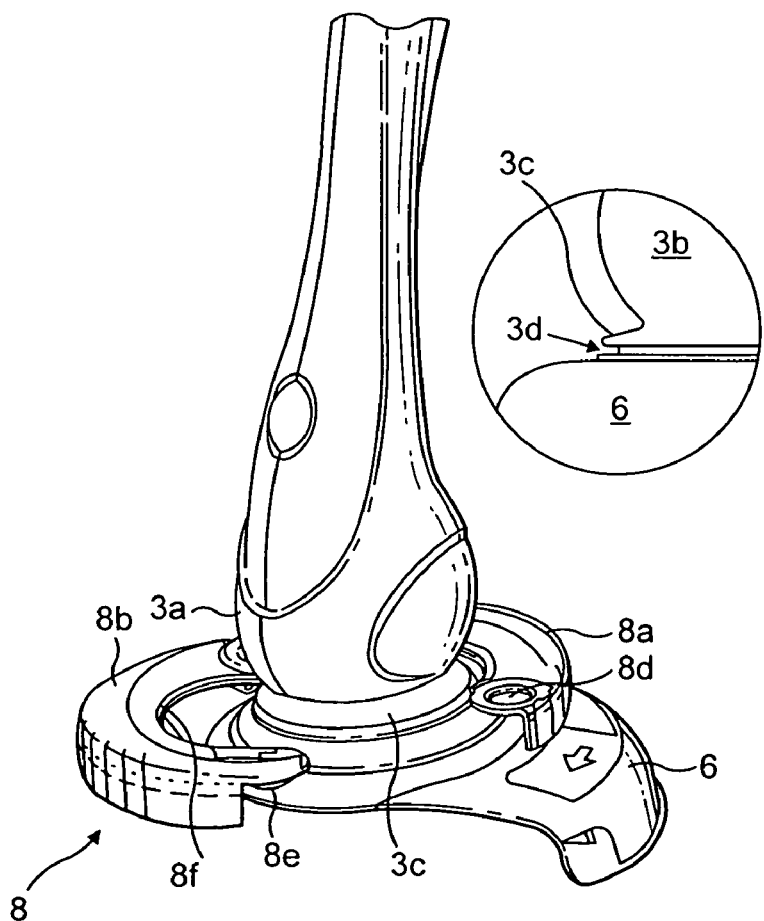
FIG. 7 is a perspective view showing how the wheel is detachably fixed to the trimmer.

FIG. 6 shows the wheel 8 separate from the trimmer, the wheel being constituted by two generally semi-circular members 8*a* and 8*b*, and FIG. 7 shows how the wheel is attached to, and detached from, the trimmer. First ends of the wheel members 8*a* and 8*b* are pivotally connected by means of a pivot 8*c*, the other ends of the wheel members being provided respectively with a recess 8*d* and a complementary projection 8*e*. The inner circumferential region of the wheel 8 is formed with an inwardly-projecting flange 8*f*.

In order to attach the wheel 8 to the trimmer, the wheel is presented to the trimmer in the opened-up configuration shown in FIG. 6. The inner circumferential region of the wheel 8 is then placed around the trimmer between the housing 3*a* and the guard 6. The flange 8*f* is slotted into a complementary recess 3*d* (see the enlarged view of FIG. 7) formed in the neck portion 3*c*. The wheel 8 is then closed by snap engagement of the recess 8*d* and the projection 8*e*.

As shown in FIGS. 6 and 7, the rim 8*g* of the wheel 8 is formed with ribs to improve gripping of contact of the wheel with the ground.

One advantage of the 120° or 240° rotational angle necessary to convert between the two modes is that, in the edging mode, the shaft 2 is generally aligned with the edge of the lawn, so that the user can carry out an edging operation when positioned behind the cutting head 1 and moving forwards (or backwards) along the edge of the lawn. This enables the user to line up the cutter line 5 with the edge of the lawn, because the user's eye can be positioned substantially in the plane of the lawn edge. This is to be contrasted with known trimmers, in which the user faces the edge of the lawn when the trimmer is in the edging position, and has to move sideways parallel to the lawn edge to carry out an edging operation. Clearly, in this position, the user cannot line up the cutter line accurately with the lawn edge. A further advantage of the trimmer described above is that, with the trimmer in the edging configuration as shown in FIG. 2, the direction of rotation of the cutter line 5 is such as to throw cut grass and debris directly away from the user, that is to say at 180° to the user. This is because the user is positioned "behind" the cutting head. This is to be contrasted with known trimmer/edgers, in which the user stands at substantially 90° to the edge of the lawn (and hence to the plane of rotation of the cutter). Accordingly, there is less chance of the user of the trimmer of the present invention being hit by flying debris than with known devices.

An advantage of this trimmer is that the wheel 8 has a relatively large diameter. The trimmer can, therefore, handle uneven lawn surfaces rather better than known wheeled trimmers which typically have a small wheel hanging off the front of the cutting head. This is particularly the case where the trimmer is operated using only one hand. Thus, because of the large diameter wheel, the trimmer described above can be operated using only one hand, whilst negotiating uneven lawn surfaces and ensuring an accurate edging action.

As the wheel 8 is positioned between the guard 6 and the housing 3*a*, it is shielded from grass cuttings and soil thrown up by the cutter line 5 when the trimmer is used in the edging mode. Consequently, the wheel 8 needs to be cleaned substantially less often than a known type of trimmer which has a wheel positioned within its guard adjacent to the cutter.

Another advantage of positioning the wheel 8 outside the guard 6 is that it contacts the ground away from the immediate edge of a lawn, and so is less likely to fall off the edge of a lawn during an edging operation, particularly where the lawn edge is not straight.

Yet another advantage of the wheel 8 is that it is easily detachable from the trimmer so that, when cleaning is required, the wheel can easily be removed and cleaned, for example with a stiff brush.

A further advantage of the detachable wheel 8 is that the trimmer can be provided in a partially-assembled state, thus reducing packaging size and cost, and transportation and storage costs.

Another advantage of the trimmer described above is that the joint about which the cutting head 1 rotates is low down, thereby reducing the difference in the height of the hand grip 9 when the trimmer is in the edging and trimming modes.

It will be apparent that modifications could be made to the trimmer described above. For example, the wheel 8 could be made of a flexible material, and be formed with a break in its circumferential rim region. Those portions of the circumferential rim region would then be formed with complementary, detachably-engagable connectors such as the recess 8*d* and the projection 8*e* of the arrangement shown in FIGS. 6 and 7. This modified form of wheel would be attachable to /detachable from, the trimmer in an analogous manner to that described above with reference to FIGS. 6 and 7.

What is claimed is:

1. A trimmer comprising a cutting head having a guard housing a cutter means, a shaft for supporting the cutting head, roller means rotatably mounted with respect to the cutting head, and drive means for driving the cutter means, the roller means being located outside the guard on the drive means side thereof, the cutting head being connected to the shaft by connection means permitting the cutting head to be positioned with its cutter means either substantially horizontal or substantially vertical, the roller means being sized to contact the ground when the cutter means is substantially vertical and to circumscribe an axis of rotation of the drive means, the arrangement being such that the cutter means extends beyond the circumference of the roller means, wherein the connection means is constituted by a rotatable joint, and wherein the rotatable joint is constituted by a ball-and-socket joint.

2. A trimmer comprising a cutting head having a guard housing a cutter means, a shaft for supporting the cutting head, roller means rotatably mounted with respect to the cutting head, and drive means for driving the cutter means, the roller means being located entirely outside the guard on the drive means side thereof, the cutting head being connected to the shaft by connection means permitting the cutting head to be positioned with its cutter means either substantially horizontal or substantially vertical, the roller means being sized to contact the ground when the cutter means is substantially vertical and to circumscribe an axis of rotation of the drive means, the arrangement being such that the cutter means extends beyond the circumference of the roller means, wherein the roller means is located between the drive means and the cutter means.

3. A trimmer as claimed in claim 2, wherein the connection means is constituted by a rotatable joint.

4. A trimmer as claimed in claim 2, wherein the connection means is constituted by a joint comprising a ball and a socket, the ball is fixed to the cutting head by a neck portion, and the socket is defined by a generally spherical socket portion provided at one end of the shaft.

5. A trimmer as claimed in claim 2, wherein the roller means is a wheel.

6. A trimmer as claimed in claim 5, wherein the wheel is detachably mounted on the connection means.

7. A trimmer as claimed in claim 5, wherein the wheel is detachably mounted on the neck portion.

8. A trimmer as claimed in claim 5, wherein the wheel is formed with a break in its circumferential region, portions of said region adjacent to the break being formed with complementary, detachably-engagable connections.

9. A trimmer as claimed in claim 8, wherein the inner circumferential region of the wall and the neck portion are formed with complementary, interengagable location means.

10. A trimmer as claimed in claim 9, wherein the wheel is formed with an inwardly-projecting flange on its inner circumferential region, the flange being engagable within a complementary recess formed in the neck portion.

11. A trimmer as claimed in claim 5, wherein the wheel has first and second generally semi-circular wheel members, first ends of which are pivotally connected together, the second ends of the wheel members being formed with complementary, detachably-engagable connectors.

12. A trimmer as claimed in claim 2, wherein the drive means comprises a motor and a drive shaft, the drive shaft passing through the roller means.

13. A trimmer as claimed in claim 12, wherein the cutter means is rotatable, and the drive engagement between the motor and the cutter means is a rotatable drive engagement.

14. A trimmer as claimed in claim 12, wherein the motor is an electric motor.

15. A trimmer as claimed in claim 14, wherein the connection means is constituted by a joint comprising a ball and a socket, and the motor is housed within the ball.

16. A trimmer as claimed in claim 2, wherein a rotatable cutter line constitutes the cutter means.

17. A trimmer as claimed in claim 2, wherein an axis of rotation of the roller means is substantially coincident with an axis of rotation of the cutter means.

18. A trimmer as claimed in claim 17, wherein the radius of the roller means is of the order of, but slightly less than, the effective radius of the cutter means.

19. A trimmer comprising a cutting head having a guard housing a cutter means, a shaft for supporting the cutting head, roller means rotatably mounted with respect to the cutting head, and drive means for driving the cutter means, the roller means being located entirely outside the guard on the drive means side thereof, the cutting head being connected to the shaft by connection means permitting the cutting head to be positioned with its cutter means either substantially horizontal or substantially vertical, the roller means being sized to contact the ground when the cutter means is substantially vertical and to circumscribe an axis of rotation of the drive means, the arrangement being such that the cutter means extends beyond the circumference of the roller means, wherein roller means is located adjacent to the guard.

* * * * *